United States Patent
Thenthiruperai

(10) Patent No.: US 7,251,604 B1
(45) Date of Patent: Jul. 31, 2007

(54) SYSTEMS AND METHOD FOR ARCHIVING AND RETRIEVING NAVIGATION POINTS IN A VOICE COMMAND PLATFORM

(75) Inventor: Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 924 days.

(21) Appl. No.: 10/286,650

(22) Filed: Nov. 1, 2002

Related U.S. Application Data

(63) Continuation-in-part of application No. 10/224,077, filed on Aug. 20, 2002, which is a continuation-in-part of application No. 09/964,117, filed on Sep. 26, 2001.

(51) Int. Cl.
*G10L 21/00* (2006.01)
(52) U.S. Cl. .................................. 704/270.1
(58) Field of Classification Search ............... None
See application file for complete search history.

(56) References Cited

U.S. PATENT DOCUMENTS

| | | | |
|---|---|---|---|
| 5,915,001 A * | 6/1999 | Uppaluru ................. | 704/270.1 |
| 6,385,583 B1 * | 5/2002 | Ladd et al. ................. | 704/270 |
| 6,546,002 B1 * | 4/2003 | Kim ........................... | 370/351 |
| 6,636,831 B1 * | 10/2003 | Profit et al. ................. | 704/275 |
| 2002/0003547 A1 * | 1/2002 | Wang et al. ................ | 345/727 |
| 2003/0200080 A1 * | 10/2003 | Galanes et al. ............ | 704/200 |

OTHER PUBLICATIONS

U.S. Appl. No. 10/224,077, filed Aug. 20, 2002, Packingham et al.
U.S. Appl. No. 09/964,117, filed Sep. 26, 2001, Packingham et al.
U.S. Appl. No. 09/964,140, filed Sep. 26, 2001, Packingham et al.
U.S. Appl. No. 09/963,776, filed Sep. 26, 2001, Packingham et al.
U.S. Appl. No. 09/964,099, filed Sep. 26, 2001, Packingham et al.
"Common Gateway Interface", CGI: Common Gateway Interface, hoohoo.ncsa.uiuc.edu/cgi/ intro.html, printed Sep. 9, 2002 (2 pages).

* cited by examiner

*Primary Examiner*—David D. Knepper

(57) ABSTRACT

A method and system for identifying, saving and utilizing bookmarks in a voice-command platform. The system allows a user to bookmark objects specified within voice-markup filed resulting in the ability to directly recall the object rather than the voice-markup file as a whole. The system of the invention also provides a user of the voice command platform with a list of proposed bookmark names that are appropriate for the object. Once a user selects a bookmark, the platform may determine that a voice command is a bookmark command, such as a request to save a given voice command navigation point in a centralized list of bookmarks for the user, or to recall a navigation point from the user's centralized list, and the platform may respond to the bookmark command accordingly. The system improves accuracy in the use of bookmarks by proposing bookmark names for a given navigation point that avoid confusion with established grammars.

28 Claims, 2 Drawing Sheets

SYSTEMS AND METHOD FOR ARCHIVING AND RETRIEVING NAVIGATION POINTS IN A VOICE COMMAND PLATFORM

RELATED APPLICATIONS

This application is a continuation-in-part of application Ser. No. 10/224,077, filed Aug. 20, 2002, which is a continuation in part of application Ser. No. 09/964,117 filed Sep. 26, 2001. It is also related to the following commonly owned applications filed on Sep. 26, 2001: (i) "Method and System for Dynamic Control Over Voice-Processing in a Voice Command Platform," naming Kevin Packingham, Elizabeth Roche and Terry T. Yu as co-inventors, (ii) "Method and System for Use of Navigation History in a Voice Command Platform," naming Kevin Packingham as inventor, and (iii) "Method and System for Consolidated Message Notification in a Voice Command Platform," naming Kevin Packingham and Robert W. Hammond as co-inventors. The entirety of each of these other applications is hereby incorporated by reference.

BACKGROUND

1. Field of the Invention

The present invention relates to telecommunications and, more particularly, to functions of a voice command platform.

2. Description of Related Art

A voice command platform provides an interface between speech communication with a user and computer-executed voice command applications. Generally speaking, a person can call a voice command platform from any telephone and, by speaking commands, can browse through navigation points (e.g., applications and/or menus items within the applications) to access and communicate information. The voice command platform can thus receive spoken commands from the user and use the commands to guide its execution of voice command applications, and the voice command platform can "speak" to a user as dictated by logic in voice command applications.

For instance, a person may call a voice command platform, and the platform may apply a voice command application that causes the platform to speak to the user, "Hello. Would you like to hear a weather forecast, sports scores, or stock quotes?" In response, the person may state to the platform, "weather forecast." Given this response, the application may cause the platform to load and execute a subsidiary weather forecasting application. The weather forecasting application may direct the platform to speak another speech prompt to the person, such as "Would you like to hear today's weather or an extended forecast?" The person may then respond, and the weather forecasting application may direct the voice command platform to execute additional logic or to load and execute another application based on the person's response.

A robust voice command platform should therefore be able to (i) receive and recognize speech spoken by a user and (ii) provide speech to a user. The platform can achieve these functions in various ways.

On the incoming side, for instance, the platform may include an analog-to-digital (A-D) converter for converting an analog speech signal from a user into a digitized incoming speech signal. (Alternatively, the user's speech signal might already be digitized, as in a voice-over-IP communication system, for instance, in which case A-D conversion would be unnecessary). The platform may then include a speech recognition (SR) engine, which functions to analyze the digitized incoming speech signal and to identify words in the speech. The SR engine will typically be a software module executable by a processor.

Usually, a voice command application will specify which words or "grammars" a user can speak in response to a prompt for instance. Therefore, the SR engine will seek to identify one of the possible spoken responses. (Alternatively, the SR engine may operate to identify any words without limitation).

In order to identify words in the incoming speech, the SR engine will typically include or have access to a dictionary database of "phonemes" (small units of speech that distinguish one utterance from another). The SR engine will then analyze the waveform represented by the incoming digitized speech signal and, based on the dictionary database, will determine whether the waveform represents particular words. For instance, if a voice command application allows for a user to respond to a prompt with the grammars "sales," "service" or "operator", the SR engine may identify the sequence of one or more phonemes that makes up each of these grammars respectively. The SR engine may then analyze the waveform of the incoming digitized speech signal in search of a waveform that represents one of those sequences of phonemes. Once the SR engine finds a match, the voice command platform may continue processing the application in view of the user's spoken response.

Additionally, the SR engine or an ancillary module in the voice command platform will typically function to detect DTMF tones dialed by a user and to convert those DTMF tones into representative data for use in the execution of a voice command application. Thus, for instance, a voice command application might define a particular DTMF grammar as an acceptable response by a user. Upon detection of that DTMF grammar, the platform may then apply associated logic in the application.

On the outgoing side, the voice command platform may include a text-to-speech (TTS) engine for converting text into outgoing digitized speech signals. In turn, the platform may include a digital-to-analog (D-A) converter for converting the outgoing digitized speech signals into audible voice that can be communicated to a user. (Alternatively, the platform might output the digitized speech signal itself, such as in a voice-over-IP communication system).

A voice command application may thus specify text that represents voice prompts to be spoken to a user. When the voice command platform encounters an instruction to speak such text, the platform may provide the text to the TTS engine. The TTS engine may then convert the text to an outgoing digitized speech signal, and the platform may convert the signal to analog speech and send it to the user. In converting from text to speech, the TTS engine may also make use of the dictionary database of phonemes, so that it can piece together the words that make up the designated speech.

Also on the outgoing side, a voice command platform may include a set of stored voice prompts, in the form of digitized audio files (e.g., *.wav files) for instance. These stored voice prompts would often be common prompts, such as "Hello", "Ready", "Please select from the following options", or the like. Each stored voice prompt might have an associated label (e.g., a filename under which the prompt is stored). By reference to the label, a voice command application might specify that the voice command platform should play the prompt to a user. In response, the voice command platform may retrieve the audio file, convert it to an analog waveform, and send the analog waveform to the user.

A voice command application can reside permanently on the voice command platform, or it can be loaded dynamically into the platform. For instance, the platform can include or be coupled with a network or storage medium that maintains various voice command applications. When a user calls the platform, the platform can thus load an application from the storage medium and execute the application. Further, in response to logic in the application (such as logic keyed to a user's response to a menu of options), the platform can load and execute another application. In this way, a user can navigate through a series of applications and menus in the various applications, during a given session with the platform.

A voice command application can be written or rendered in any of a variety of computer languages. These applications and the documents they contain are generally in the form of voice-markup files. One language for creating these voice markup files is VoiceXML (or simply "VXML"), which is a tag-based language similar the HTML language that underlies most Internet web pages. (Other analogous languages, such as SALT, SpeechML and VoxML for instance, are available as well.) By coding a voice command application in VXML, the application can thus be made to readily access and provide web content, just as an HTML-based application can do. Further, when executed by the voice command platform, the VXML application can effectively communicate with a user through speech.

An application developer can write a voice command application in VXML. Alternatively, an application developer can write an application in another language (such as Java, C, C++, etc.), and the content of that application can be rendered in VXML. (For instance, when the platform loads an application, the platform or some intermediate entity could transcode the application from its native code to VXML.)

Voice command applications can be made up of voice-markup files or documents. In order for a voice command platform to execute an application or other tag-based application, the platform should include a browser or "interpreter." The browser can interpret voice-markup files and make them available to the user. More specifically, the browser functions to interpret tags set forth in the application and to cause a processor to execute associated logic set forth in the application.

A VXML application can be made up of a number of VXML documents, just like an HTML web site can made up of a number of HTML pages. A VXML application that is made up of more than one VXML document should include a root document, somewhat analogous to an HTML home page. According to VXML, the root document defines variables that are available to all subsidiary documents in the application. Whenever a user interacts with documents of a VXML application, the root document of the application is also loaded. Therefore, variables defined in the root document should be available during execution of any of the documents of the application.

Each VXML document will include a <vxml> tag to indicate that it is a VXML document. It may then include a number of <form> sections that can be interactive (e.g., prompting a user for input) or informational (e.g., simply conveying information to a user.) Within a given form, it may further include other executable logic.

A VXML document can also define grammars as described above. In particular, VXML grammars are words or terms that the VXML application will accept as input during execution of the application. When a VXML application is executed on a voice command platform, the platform may provide the SR engine with an indication of the grammars that the VXML application will accept. Once the SR engine detects that a user has spoken one of the grammars, the platform may apply that grammar as input to the VXML application, typically proceeding to execute a set of logic (e.g., a link to another document) in response.

For example, a VXML document can define as grammars a number of possible options, as well as a number of possible words that a user can speak to select those options. For instance, a document might define as options of clothing the items "hat", "shirt", "pants" and "shoes". In turn, the document might define the following as acceptable grammars for the "hat" option: "hat", "visor", "chapeaux" and "beret".

Grammars defined in the root document of a VXML application are, by default, available for use in all of the subsidiary documents of the application. Thus, when a voice command platform is executing a VXML application, if a user speaks a grammar that is defined in the root document of the application, the voice command platform should responsively execute the logic that accompanies that grammar in the root document of the application.

In a voice command platform, each navigation point may have a respective identifier or label. For example, each voice command application can have a respective label, such as a network address where the application is maintained. As another example, a voice command application can define a number of successive menus through which a user can browse, and each menu might have a respective label by which it can be referenced. A voice command platform can use these labels to move from application to application or from menu item to menu item, just as hyperlinks operate to cause a browser to move from one web page (or component of one web page) to another.

In VXML, for instance, each VXML document will have a respective Universal Resource Identifier (URI), which is akin to a Universal Resource Locator (URL) used to identify the network location of an HTML page. A given VXML document may thus define logic that instructs the voice command platform to load and execute another VXML document from a designated URI. For instance, a VXML document may indicate that, if a user speaks a particular grammar, the platform should load and execute a particular VXML document from a designated URI, but that, if the user speaks another grammar, the platform should load and execute another VXML document from another designated URI. In addition, a VXML document may also specify navigation points that are not in a VXML URI format. Objects associated with these navigation points will not generally be voice-markup files and, thus, can not be directly interpreted by the VXML browser. For example, many VXML documents specify audio files. These audio files are generally formatted *.wav files or u-law files and not as voice-markup files. But for the fact that these audio files are specified in a voice-markup file, the browser would not be able to properly interpret them.

An example of a VXML application is a weather reporting application. The weather reporting application may have a root document that includes a tag defining a welcome message and prompting a user to indicate a city or zip code. The root document may further set forth a bundle of grammars that are possible city names and corresponding zip codes that a user can speak in response to the prompt.

When the voice command platform executes this root document, it may thus send the welcome message/prompt to the TTS engine to have the message/prompt spoken to the user. In turn, when the user speaks a response, the SR engine would identify the response as one of the acceptable grammars. The platform would then continue executing the root document in view of the spoken response.

The root document might next prompt the user to indicate whether the user would like to hear today's weather or an extended forecast, and the user would again speak a response. In turn, the root document might indicate that, if the user selects "today's weather," the platform should load and execute a subsidiary document from a designated URI, and if the user selects "extended forecast," the platform should load and execute a different subsidiary document from another designated URI. Of course, many other examples of VXML applications are possible as well.

In most cases, a platform provider will own and operate the voice command platform. Content providers (or independent application developers having a relationship with a content provider for instance) will then provide the VXML applications to be executed by the platform. The platform provider may also provide some applications for the platform and may therefore function as a content provider as well.

Further, a content provider or other application developer can personalize a VXML application, through reference to user profiles. For example, a telecommunications service provider (e.g., local exchange carrier or interexchange carrier) can provide a voice-activated-dialing (VAD) application that allows users to dial a telephone number by speaking a name. To support this feature, the VAD application may direct the voice command platform to prompt a user for a user ID or to determine the user ID based on calling number identification provided when the user's call was connected to the platform. The VAD application may then instruct the platform to call up a personalized VAD application (through use of Microsoft Active Server Pages, for instance), which is tied to the user's personal address book. Each name in the address book may then define an acceptable grammar. When the user speaks one of the names, the application may cause the platform to retrieve a corresponding telephone number and to provide that number to a network switch to facilitate initiating the call.

SUMMARY

The present invention is directed to a method and system for responding to voice commands in a voice-command platform. In particular, the present invention is directed to the selection, creation, storage and use of bookmarks in a voice command platform.

Generally speaking, the platform receives a voice command during a voice command session with a user, and the platform responsively carries out a set of system-level logic. The present invention is concerned with a particular type of voice command known as a bookmark command. Bookmarks are shortcuts or links to a specific navigation point on the voice command platform. The user may establish a bookmark name, an alias grammar for the navigation point, that the system will save in the user profile and associate with the navigation point. Thus, when the user wants to access the navigation point all that is necessary is that the user invoke or recall the bookmark (generally by saying the bookmark name after a system level command such as "recall") and the system will take the user to the desired navigation point.

As an example, the platform may determine that the voice command is a bookmark command, such as a request to save a given voice command navigation point in a centralized list of bookmarks for the user, or to recall a navigation point from the user's centralized list. Upon receiving the command, the platform may respond to the bookmark command accordingly and execute logic to effectuate the command. In this manner a user can build a set of bookmarks in the user's centralized list and utilize those bookmarks that reside in the centralized list. The end result is a more efficient use of the platform.

In one respect, the invention may take the form of a method for effectively establishing a bookmark for a navigation point of an object located within a platform document wherein the object is in a format not compatible with the platform's browser, i.e., not a voice-markup file. As noted above, voice command platforms generally include a processor that may execute a browser or interpreter to access and execute voice command applications. However, if the file that browser accesses in not in the proper format, e.g. not a voice-markup file, then the browser will be incapable of interpreting the file. The method of the present invention may include determining whether the navigation point to be bookmarked is in a format compatible with the platform and browser being employed. If the file is not compatible, the method may execute logic that creates a new file of the proper format that specifies the navigation point to be bookmark. In this manner the browser can interpret the newly created file and then, through the new file, call up the object at the navigation point desired to be reached by the user.

In another respect, the invention may take the form of a voice command platform that includes a user communication interface, a processor, an application-processing module, a user profile store, and speech-recognition logic. The application-processing module is executable by the processor to process voice-markup files (e.g., VXML applications) that have navigation points (e.g., Universal Resource Identifiers) and that define user-prompts, allowed grammars and application-logic. The application processing module is also capable of establishing bookmarks pointing to navigation points corresponding to voice-markup files and objects specified within voice-markup files. The objects specified within voice-markup files may take on various forms. Of particular interest to the present invention are objects that are not voice-markup files such as an audio file.

The user profile store includes bookmark-data respectively for each of a plurality of users. A given set of bookmark-data for a given user includes a number of bookmark-names each associated with a bookmark pointing to a respective, corresponding navigation point. In turn, the speech-recognition logic is executable by the processor to recognize a bookmark-name in a speech signal that the platform receives from the given user via the user communication interface. Thus, the processor uses the given set of bookmark-data to identify the navigation point corresponding to the recognized bookmark-name. And the processor then loads and processes the file or object that has that navigation point (e.g., a VXML document or application located at a designated URI).

The voice command platform may further include bookmark-saving logic executable by the processor to save a bookmark-name and corresponding navigation point as bookmark-data for a user. In an exemplary arrangement, the bookmark-saving logic can be executable in response to a "Save" command that a user speaks to the platform and that the speech-recognition logic is executable to recognize. The platform may further have the ability to suggest potential bookmark-names to the user including bookmark-names provided by the content provider and bookmark-names generated by the platform.

Additionally, the speech-recognition logic can be executable to recognize a bookmark-recall command and a bookmark-name in the speech signal received from the given user via the user communication interface. In response to the bookmark recall command, the processor may then use the given set of bookmark-data to identify the navigation point that corresponds to the recognized bookmark-name, and the processor may then load and execute a file or application from that navigation point.

In another respect, the invention may take the form of a bookmark-management method. The method may generally involve storing, respectively for each of a number of users, bookmark-data that indicates bookmark-names and corresponding pointers to navigation points of voice command applications. More specifically, the method may include generating one or more proposed bookmark-names from the content of a voice-markup file. The method may next include proposing a list of bookmark-names to a user including the bookmark-names generated from the content of the voice-markup file. The method may then involve receiving from a user, via a telecommunications network, a bookmark-save voice command, and responsively saving as bookmark-data for the user a pointer to a designated navigation point. In turn, the method may involve receiving from a user, via a telecommunications network, a bookmark-recall command designating a given bookmark-name, using the bookmark-data to identify a given navigation point corresponding to the given bookmark-name, and executing a voice-markup file that is located at the given navigation point.

In yet another respect, the invention may take the form of a voice command platform that is accessible by users over a telecommunications network. The voice command platform preferably includes (e.g., has access to) a user profile store that indicates, respectively for each of a plurality of users, a set of bookmarks for the user. Each bookmark can advantageously point to a navigation point. In turn, the platform may include logic executable to manage the bookmarks for the user including effectively creating bookmarks for navigation points that are not associated with voice-markup files.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Voice Command System

Figure 1:
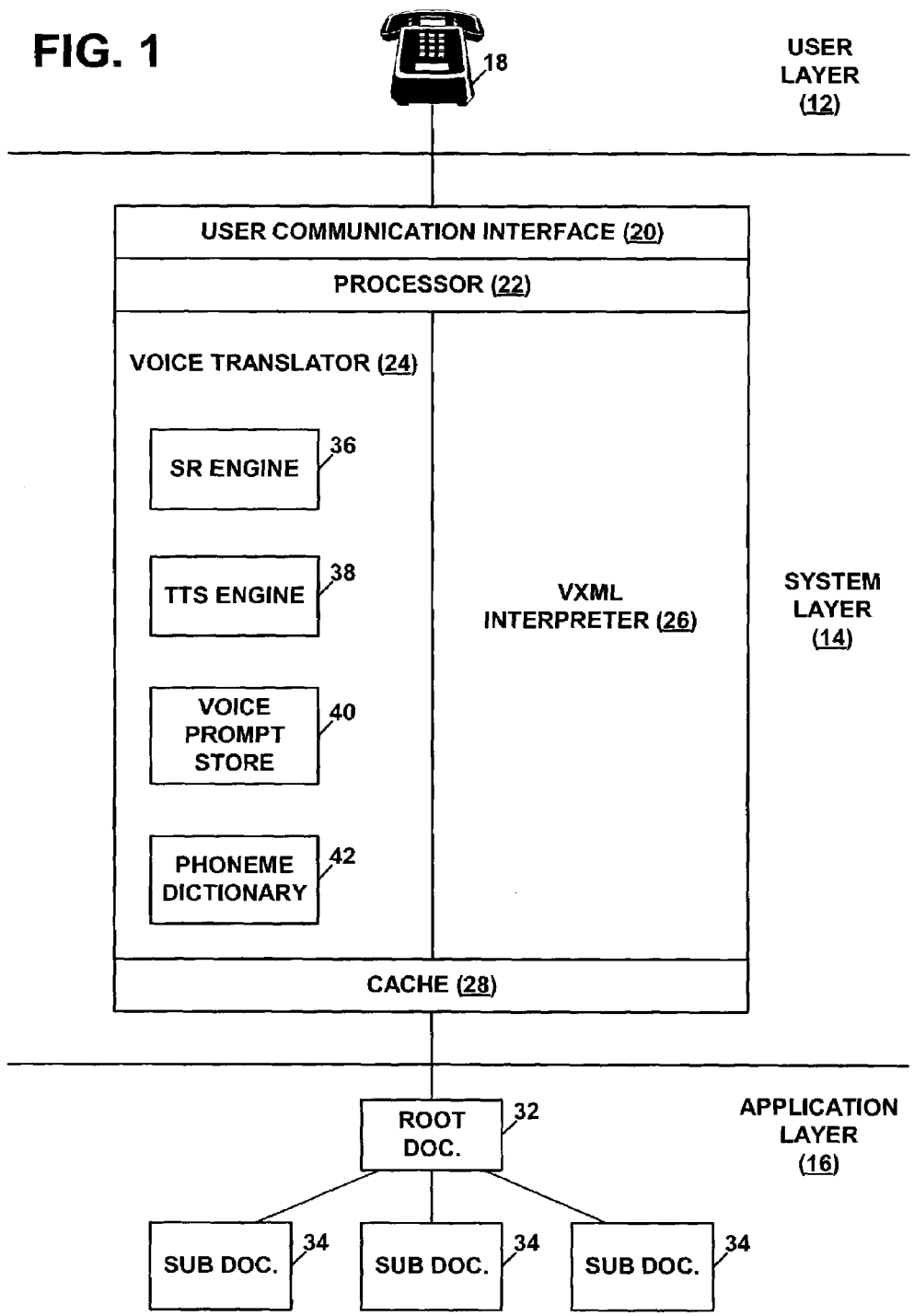
FIG. 1 is a functional block diagram illustrating the layers of a system in which the exemplary embodiments can be employed.

Referring to the drawings, FIG. 1 is a functional block diagram illustrating the layers of a system in which an exemplary embodiment of the present invention can be employed. As shown in FIG. 1, the system may be considered to include three layers, (i) a user layer 12, (ii) a platform or system layer 14, and (iii) an application layer 16. The user layer 12 provides a mechanism 18, such as a telephone, for a person to communicate by voice with the platform. The system layer, in turn, includes a user communication interface 20, a processor 22 (i.e., one or more processors), a voice-processing module 24, a VXML interpreter module 26, and cache 28. Application layer 16 then defines an application 30, which may be made up of a root document 32 and subsidiary documents 34 that can be loaded into cache 28 and executed by processor 22, i.e., by the voice command platform.

User communication interface 20 may take various forms. For example, the user communication interface can provide a circuit or packet interface with a telecommunications network (such as the PTSN or the Internet, either of which may provide connectivity to one or more users via at least one wireless communications link—such as a cellular communication system for instance). The communication interface may, in turn, include an A-D and D-A converter (not shown) as described above, for converting between analog signals on the user side and digital signals on the platform side. Processor 22 then sends and receives communications via user communication interface 20.

Voice-processing module 24 and VXML interpreter module 26 preferably define program instructions that can be executed by processor 22 and data that can be referenced by the processor, to carry out basic voice platform functions. All of this program logic can be stored in suitable data storage, such as ROM or a disk drive for example.

For instance, voice-processing module 24 preferably defines an SR engine 36 and a TTS engine 38, as well as a voice prompt store 40. Further, voice-processing module 24 may include a phoneme dictionary 42 that the processor can reference to facilitate operation of the SR engine and the TTS engine. VXML interpreter module 26, in turn, may facilitate execution of application 30, such as by interpreting tags in the application.

Cache 28 functions to temporarily hold application 30 (or one or more documents of the application) when processor 22 is executing the application. Thus, in operation, processor 22 may retrieve application 30 from a designated URI on the Internet (or elsewhere) and may load the application into cache 28. The processor may then execute the application, using VXML interpreter 26 to interpret tags, using TTS engine 38 and voice prompt store 40 to send speech to a user, and using SR engine 36 to recognize speech spoken by a user.

It should be understood that this and other arrangements described herein are set forth for purposes of example only. As such, those skilled in the art will appreciate that other arrangements and other elements (e.g., machines, interfaces, functions, orders and groupings of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

For example, although the voice command system is shown to include a VXML interpreter, the system may include another type of voice browser. Alternatively, the system might not be browser-based at all. In that event, some of the functions described herein could be applied by analogy in another manner, such as through more conventional interactive voice response (IVR) processing. Other examples are possible as well.

2. Enhanced System Layer

Figure 2:
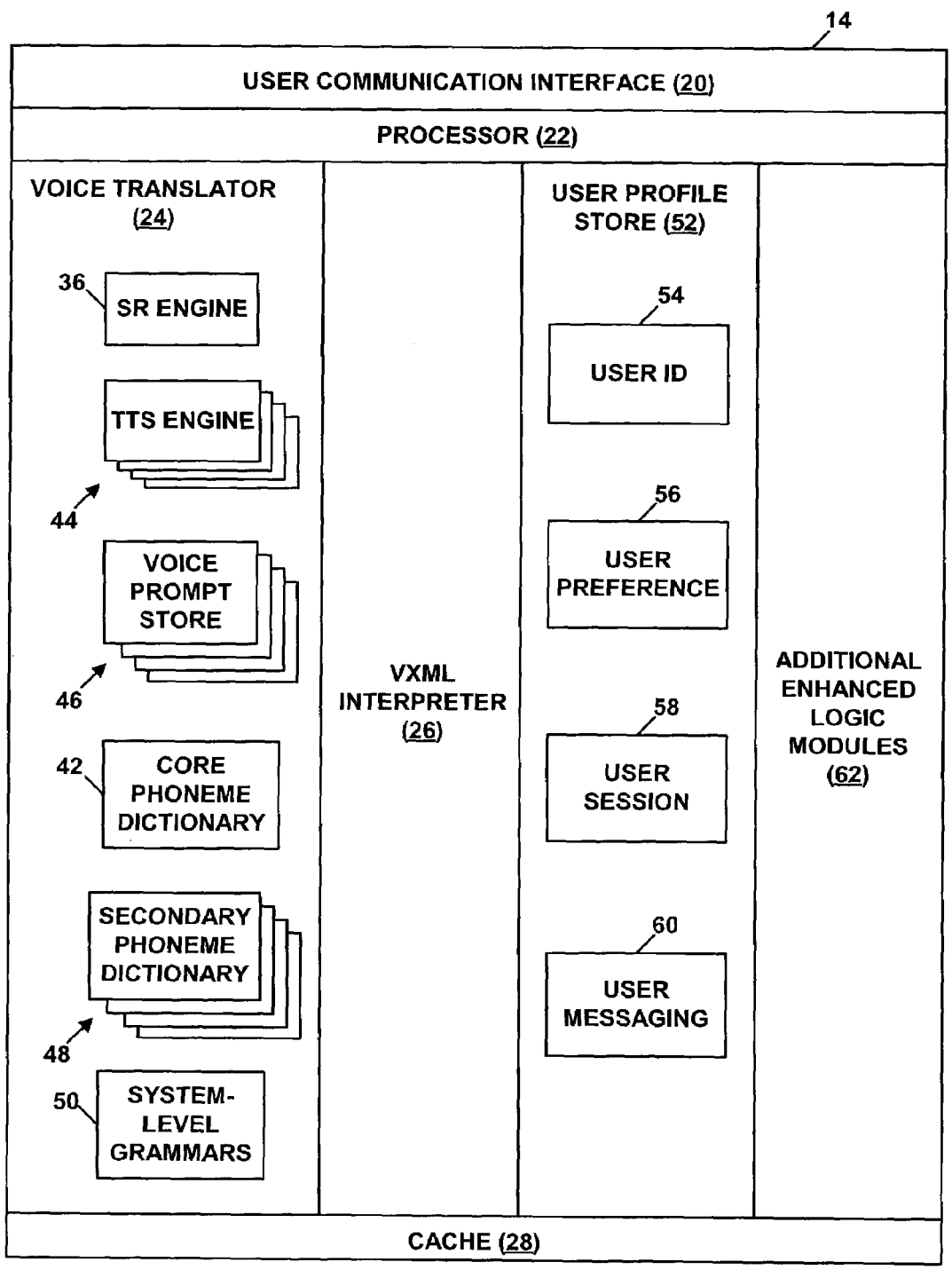
FIG. 2 is a functional block diagram of a voice command platform including enhanced system logic in accordance with the exemplary embodiments.

In accordance with the exemplary embodiment, system layer 14 can be enhanced in several respects, so as to provide a more robust voice command platform. FIG. 2 depicts an expanded functional block diagram of the system layer 14, showing some of the improvements contemplated.

As shown by way of example in FIG. 2, exemplary system layer 14 includes the components described above, such as a user communication interface 20, a processor 22, voice-processing 24, VXML interpreter 26, and cache 28. In addition, according to the exemplary embodiment, the system layer includes or has access to an enhanced set of system logic, preferably comprised of software modules that can be executed by the processor and data that can be referenced by the processor.

Some or all of the enhanced system logic can be co-located with the platform or can be located elsewhere, such as on an accessible network. Further, aspects of this enhanced system logic may be integrated together with the voice-processing module 24 and/or with the VXML interpreter module 26 to any extent desired.

Referring in more detail to FIG. 2, the enhanced system logic can include multiple text-to-speech engines ($TTS_1$, $TTS_2$, ... $TTS_N$) 44 (e.g., separate sub-routines of a main TTS module, or separate TTS modules altogether) that may be selectively applied by processor 22 (i.e.; selected by the processor in response to a designated stimulus or instruction). The TTS engines can differ from each other in terms of language (e.g., English, Spanish, etc.), dialect (e.g., accent), voice (e.g., male, female) and/or other aspects, so as to speak to users in different manners. (In the exemplary embodiment, the platform can similarly include multiple speech recognition engines (not shown), or multiple core phoneme dictionaries, to facilitate converting speech of various types to data.)

Additionally, the enhanced system logic can include multiple voice prompt stores or sets of voice prompts 46 that can be selectively applied by the processor. Each prompt set may differ from the other prompt sets in various ways, such as being spoken in different dialects or different voices in a common language, or being spoken in different languages, or with different background music, for instance.

For example, one prompt set might comprise the prompts spoken in a particular celebrity voice (e.g., in a recognizable voice of a particular movie or television star), and another prompt set might comprise the prompts spoken in a different celebrity voice. Still another prompt set might comprise the prompts spoken in a male voice, and another might comprise the prompts spoken in a female voice. Further, another might comprise the prompts spoken in a high energy voice, while another might comprise the prompts spoken in a low key voice. And still another might comprise the prompts spoken in English, while another might comprise the prompts spoken in French.

On the platform, the prompt sets can be stored in separate directories (folders) on a disk drive, where each directory has a respective name to designate the prompt set. For instance, the directories may be named "Celebrity1", "Celebrity2", "male", "female", "high energy", "low key," etc. This can facilitate quick and easy retrieval of desired prompts. Other mechanisms for storing and identifying the various prompt sets, however, are possible as well.

As further shown in FIG. 2, the enhanced system logic can include a set of one or more secondary phoneme dictionaries 48. Each of these secondary dictionaries is preferably an application-specific (or content-provider-specific) phoneme dictionary, provided by a content provider to improve voice processing functions when the platform is executing the respective application.

Additionally, the enhanced system logic can include a set of system-level grammars 50. The system-level grammars 50 are preferably grammars that are defined for the voice command platform generally. As such, the voice command platform can recognize the system-level grammars when spoken by a user at substantially any navigation point, i.e., while any voice command application is being executed by the platform.

In addition, the enhanced system logic can include a user profile store 52. For various aspects of the exemplary embodiment, the user profile store 52 may define (i) user ID information 54, (ii) user preference information 56, (iii) user session information 58, and (iv) user consolidated-messaging information 60. This information can be maintained in a relational database or in any other manner desired (whether as one module or separate objects, such as a meta-directory for instance), and it can be co-located with the rest of the platform or can be located elsewhere.

User ID information 54 may include any information that the platform can use to identify a user, so as to facilitate providing personalized voice command services across multiple applications. In the exemplary embodiment, user ID information will be ANI information, such as the billing number or telephone number of the calling party. Alternatively, however, user ID information can also take other forms, such as username and password.

User preference information 56 can also take various forms. For example, user preference information may include a set of personal grammars/aliases, which define grammars specific to a user. As another example, user preference information may include an expert mode flag (or flags) for the user, which indicates whether or not the platform should interface with the user according to an "expert mode." As still another example, user preference information may include indications of preferred content providers, such as a preferred e-mail provider, a preferred voice-mail provider, a preferred weather-reporting provider, etc.

As yet another example, user preference information may include a set of bookmarks/favorites (with associated names), which function as user-specific shortcuts to URIs or menu items. And as still a further example, user preference information may include a user-specific speech persona, which indicates a voice or persona for the voice-processor to use in communicating to the user (e.g., an indication of which of several possible pre-recorded versions of a prompt to play to the user and/or which TTS engine to use for the user).

User session information 58 can also take various forms. For example, user session information can comprise a record of a user's current session state. In this regard, session state information may include an indication of whether or not the voice-processor (or, more specifically, the speech recognition engine) is currently muted for the user's session. And as still another example, session state information may include an indication of which of the multiple TTS engines 44 and/or voice prompt sets 46 is currently active (selected, or being used) for the user or for the user's session.

User session information 58 can also comprise a record of a user's navigation history. For example, the navigation history record may specify in order the last predetermined number of navigation points (e.g., URIs, menu items, etc.) that the user has accessed, preferably including the latest navigation point accessed by the user. Further, the navigation history record may include a summary ("rollup") indication of the number of times that the user has accessed each navigation point. This navigation history information can be used as a basis to determine whether the system should automatically switch the user to expert mode, as well as to restore a user's voice command session in the event a system disconnect occurs.

User consolidated-messaging information 60, similarly, can take various forms. In the exemplary embodiment, the consolidated-messaging information comprises a summary the number of messages waiting for the user at multiple separate message portals. For instance, the consolidated-messaging information for a user can indicate a count of voice mail messages waiting for the user at one message portal, a count of e-mail messages waiting for the user at another message portal, and account of fax messages waiting for the user at another message portal. The user profile may also identify each of the user's message accounts (e.g., POP3 e-mail account information, etc.)

As still further shown in FIG. 2, enhanced system logic preferably defines a number of additional logic modules 62 that are executable by the processor to carry out enhanced functions. These enhanced functions can involve, for instance, (a) providing enhanced response to voice commands, (b) allowing dynamic control over the voice-processing module, (c) monitoring and use of navigation history, and (d) providing unified messaging notification.

Some of these functions may involve having processor 22 refer to user profile store 52 in order to determine a user preferences or other user-specific information. In order to facilitate this, a mechanism should preferably be provided to identify a user who contacts the platform. This mechanism can take various forms.

As noted above, for example, user profile store 52 preferably indicates as user ID information each user's ANI. When a user places a conventional telephone call to the voice command platform, the processor can receive the user's ANI in the call setup signaling or otherwise. The processor may then query the user profile store 52 to find the user's profile record. In turn, the processor can store in memory a pointer to the user's profile record. Alternatively, the processor can extract parameters from the user's profile record and store those parameters in memory for quicker access.

As another example, as also noted above, user profile store 52 could indicate a username and password for each user. In an alternative arrangement, the processor could be programmed to prompt a user to specify a username when the user calls the platform, and the processor can then query the user profile store to find a matching record. Further, the processor can prompt the user to specify a password, and the processor can then authenticate the user by reference to the stored password in the profile record.

This alternative identification function can be carried out by having the processor execute a system-level VXML application when a caller calls the platform. The system-level application may define a username voice prompt such as "Welcome to the voice command system. Please state your name to begin." In turn, the system-level application can receive a response spoken by the user and can direct the processor to search the user profile for a matching record.

Each of the exemplary enhanced functions will now be described in the following sections.

a. Providing Enhanced Response to Voice Commands

In accordance with the exemplary embodiment, the enhanced system logic provides for enhanced response to voice commands. Generally speaking, the platform receives a voice command during a voice command session with a user, and the platform then responsively carries out a set of system-level logic.

As examples, enhanced response to voice commands can involve (i) recognizing system-level grammars (i.e., system-specific grammars) that can be spoken by a user, (ii) recognizing personal grammars (i.e., user-specific aliases of other grammars) that can be spoken by a user, and (iii) hosting a set of personal bookmarks (i.e., user-specific shortcuts to navigation points). These examples will be described in the following sections.

i. Responding to User Utterance of System-Level Grammars

Normally, an application that is executed by the voice command platform can define a set of grammars that the system layer will recognize. For instance, a weather reporting application might define "today's weather" and "extended forecast" as grammars that a user can speak, and the application might then define logic to be executed respectively in response to each of those grammars.

In accordance with the exemplary embodiment, as noted above, enhanced system logic 40 can include a set of system layer grammars, which are grammars that the system layer (e.g., VXML interpreter) will recognize globally, i.e., substantially regardless of what application the system is currently executing.

The system-level grammars, and their associated logic, can take various forms. For example, the processor can be programmed to recognize as system-level grammars the terms "Voice Command" and "Main Menu" and to respond to either of these grammars by presenting the user with the initial ready prompt, i.e., the prompt that the user might first encounter when the user calls the platform. As another example, the processor can be programmed to recognize as a system-level grammar the word "Mute" and to respond to this grammar by turning off (or partially turning off) the speech recognition engine 36. Similarly, the processor can be programmed to recognize the word "Unmute" and to respond to this grammar by turning on the speech recognition engine 36.

As still another example, the processor can be programmed to recognize the grammars "Save" and "Bookmark" and to respond to either of these grammars by saving in the user's profile a bookmark to the current navigation point, or by executing a subsidiary bookmark-application. (As will be noted below, the processor may prompt the user to specify a shortcut name for the bookmark, which the processor may also store.) And as yet another example, the processor may be programmed to recognize the grammar "Voice Command Help" and to respond to this grammar by executing a voice command help module/application. Still another example may be a "Pause" or "Go to Sleep" system-level grammar, which may direct the processor to pause the current session.

In the exemplary embodiment, the system-level grammars and their associated logic can be defined in a system-level application that gives the system-level grammars a global scope for subsidiary applications. For example, the SR engine can be hard-coded to recognize the set of system-level grammars. Alternatively, in a VXML-based platform for instance, the system-level application can be a root VXML application that the platform is programmed to run by default when a user calls the platform (preferably without having to be referenced by another VXML document).

The root VXML application can function to welcome the user to the platform, such as by providing an initial ready prompt to the user and providing an initial menu of choices (such as VAD, news, sports, stocks, etc.) and calls to subsidiary applications. And the root VXML application can ideally define the system-level grammars and their associated logic. Thus, as subsidiary applications are called from the root document and from subsidiary documents, the system-level grammars and associated logic defined in the root VXML application will remain available for use in all subsidiary documents.

Preferably, if a content provider defines a grammar in an application that conflicts with (e.g., is the same as) a system-level grammar, the system-level grammar will take precedence, i.e., platform would be programmed to execute the logic defined for the system-level grammar, rather than the logic defined for the conflicting application-level grammar. However, exceptions could be possible.

As another example, the system layer can be programmed with one or more system-level grammars that function as "aliases," i.e., nicknames or shortcuts (or, for that matter, more extensive names) for other grammars. For instance, the system layer might include in memory a table that translates between alias system-level grammars and actual grammars. When a user speaks one of the alias system-level grammars, the system layer can find a match in the table and responsively convert the spoken grammar into the associated actual grammar. The system-layer can then treat the actual grammar as having been spoken by the user.

Advantageously, because this aliasing mechanism exists in the system layer, the voice command platform can provide translations between aliases and actual grammars globally for all applications (or, allowing for exceptions, substantially all applications) executed by the platform. For example, the system-layer might define the terms "weather outlook" and "tomorrow's weather" as alias grammars for the word "extended forecast." In turn, when the system is executing a weather-reporting application and a user speaks "weather outlook," the system may convert "weather outlook" into "extended forecast" and treat "extended forecast" as being spoken by the user. The system may thus execute the logic that the application defines for the response "extended forecast," such as calling up an extended-forecast subsidiary URI, for instance.

ii. Responding to User Utterance of Personal-Grammars

In the exemplary embodiment, as noted above, user profile store 52 can also define a set of user-specific grammars, i.e., personal grammars. In the exemplary embodiment, these personal grammars function as aliases for other grammars, similar to the system-level alias grammars described above.

Thus, a user's profile preferably includes a table or other mechanism that translates between personal grammars and actual grammars. When a user speaks a personal grammar, the system can then find a match in the table and responsively convert the spoken grammar into the associated actual grammar. The system layer can then treat the actual grammar as having been spoken by the user.

As an example, an application may define "stocks" as a grammar that a user can select to go to a stock-reporting application. Advantageously, the user's profile may define the personal grammar "check portfolio" to correspond to the grammar "stocks." When the user speaks "check portfolio," the system can thus translate the grammar into "stocks" and proceed to execute the application as if the user has spoken "stocks." Other examples are possible as well.

iii. Establishing and Centrally Maintaining Personal Bookmarks

In accordance with the exemplary embodiment, as noted above, user profile store 52 can further include, for each user, a set of one or more bookmarks that function as user-specific shortcuts to navigation points, such as URIs or menu items. Advantageously, by maintaining these bookmarks centrally on the voice command platform (or otherwise in a manner accessible by the platform), a user can make use of the bookmarks when the user calls the platform from any location (absent other restrictions).

Preferably, the enhanced system logic provides a mechanism for maintenance of these bookmarks, such as recording the bookmarks, receiving user requests to use the bookmarks, and applying the bookmarks to navigate to a designated navigation point. In the exemplary embodiment, this can be accomplished through a system-level application (e.g., a VXML application) that a user can access by speaking a system-level grammar such as "Bookmark," i.e., the platform can be arranged to execute a bookmark-management application in response to the system-level grammar "Bookmark."

An exemplary bookmark-management application can provide a user with options such as (i) Save the current navigation point with a bookmark, (ii) Recall a bookmark, and (iii) Edit a bookmark. In response to user selection of the Save option, the bookmark-management application may direct the processor to save in the user's bookmark list the navigation point of the object that the user was accessing before the user called the bookmark-management application.

While it is often the goal to bookmark a the navigation point of a particular voice-markup file, i.e., an entire VXML document, sometimes a user may want to only bookmark an object specified within a voice-markup file such as a single file or other navigation point. For example many VXML documents specify audio files. These audio files are often set up in an audio format such as *.wav, u-law or other well known formats. Because these audio files are not typically voice-markup files, a processor executing a VXML browser cannot properly interpret them. The browser, like most programs, is only capable of interpreting documents that are in the proper format. In the case of a VXML browser, the browser typically only properly interprets voice-markup files with a .vxml extension (in much the same way a word processor may be able to process only files that have a ".doc" extension). Because the audio file is not in this format, simply establishing a bookmark that points to the navigation point of the audio file will be ineffective. While the browser may be able to locate the file, it will not be able to interpret it. The bookmark-management application of the present invention may allow the system to establish an effective bookmark for a navigation point specified within a voice-markup file regardless of whether the navigation point is associated with an object in a voice-markup file format. Thus, a user may recall the object without having to recall the entire voice-markup file.

As an example, the user may be reviewing a news application on a VXML voice communication platform. Within the application, the user may be listening to a story or audio file specified within or accessed through a VXML document. While the user is interested in the story, he may not have time to listen to it at the time, but wants to listen to it later. The user may then tell the system to "Bookmark" or "Save" the audio file. The system may respond by inquiring whether the user wants to bookmark the story or the entire VXML document. If the user opts for the story, i.e. the audio file, then it is necessary to create a bookmark which points to the navigation point of the audio file, not simply the URI of the entire VXML document.

The difficulty is that the audio file is generally not in the proper format for the VXML browser to interpret the file. However, if the audio file is specified in a voice-markup file, i.e. a compatible file, then the browser could properly interpret it. Thus, to effectively bookmark the story, a new VXML document, with a corresponding VXML URI, may be created to specify the audio file. Once the new VXML document is created it can be interpreted by the browser of the VXML platform. An example of a portion of the new VXML document that references the audio file may look as follows:

<prompt>

<audio src="http://audio.sprintvoicecommand.com/001.wav"> [Sprint launches new third generation wireless network . . . ] </audio>

</prompt>

As can be seen above, the audio file (audio.sprintvoicecommand.com/001.wav) is now coded as a VXML URI in the new voice-mark up file. The "src" term is the attribute of the audio tag that specifies the URI, i.e., the location of the audio file. This src as inserted into the new VXML document can be interpreted by the VXML browser.

The creation of this voice-markup file can be done either statically (i.e., at the time of the creation of the bookmark) or dynamically (i.e., at the time the bookmark is used or recalled). The major difference between static and dynamic creation of the voice-markup file is when it is created. In a static system, at the time the user elects to bookmark an object, the system extracts the navigation point of the object from the voice-markup file currently being reviewed by the user and specifies it in a newly created voice-markup file. The bookmark then points to the navigation point of the new voice-markup file. Generally, the new voice-markup file would be stored on platform, likely as part of the users profile. Of course, systems may vary in this regard. When a user recalls the bookmark, the system will locate the new voice-markup file and interpret the object specified therein.

In a dynamic system, the new voice markup file specifying the object is not created until the bookmark is recalled. At creation, the bookmark points to the navigation point of the object, e.g., the address associated with the audio file. When the user recalls the bookmark, the system recognizes that the bookmark points to an object that is not a voice-markup file, it therefore initiates logic that creates a new voice-markup file that specifies the object, i.e., a link to the object is incorporated into the new voice-markup file. The system then interprets the newly created voice-markup file and processes the desired object.

In either the static or dynamic system the bookmark management application may access logic to create the new voice-markup file. As an example, scripting logic (such as a common gateway interface) may be available to receive an audio file and output a new VXML document specifying the audio file. The VXML document can then be sent by http, for instance, as a POST request to the VXML browser. The POST request would include the URI of the new VXML document that was just created by the scripting logic. The audio file can then be interpreted by the browser and played to the user.

The scripting logic that generates the new VXML document may also add a text element to the document. The scripting logic can invoke the SR engine to convert the recorded audio file into text and incorporate the text into the newly created document. This text element is illustrated in the bracketed portion of the example above. This text portion of the new VXML document may be used as a backup to the audio file and also may be of assistance in referencing the document. For example, if upon recall of a bookmark the system is unable to locate the audio file (i.e., the link is not functioning), then the system can use the TTS engine to convert the text in the new VXML document to speech. The content of the audio file can then be provided to the user, even though the audio file itself was not accessible. As another example, discussed further below, the text could be used to generate potential bookmark names for the new VXML document.

Of course, the ability to bookmark an object specified within a voice-markup file is not limited to audio files. Any navigation point within a voice-markup file can be bookmarked in this same fashion regardless of its format. In this way a user can access directly that portion of a voice-markup file that is of interest, without having to navigate the entire file to get there. This is analogous to the ability of internet browsers to access labeled points within a HTML file.

The bookmark-management application may also direct the processor to prompt the user for a shortcut name (i.e., an alias) for the bookmark, possibly providing the user with a list of suggested names. Once the user speaks the name or agrees to use a name from the list, the processor may store the name in the user's bookmark list together with the URI.

The use of names from a list proposed by the system has the advantage of avoiding the user selecting a bookmark term that may easily be confused with an existing grammar. Such confusion could lead to recognition inaccuracy. Thus, there is an advantage with the system presenting the user with options that do not interfere with existing grammars thereby preventing recognition inaccuracies.

In one embodiment, the content provider may provide proposed bookmark names as part of the application. For example, in the normal course of designing a VXML application and the associated VXML documents, the content provider will append tags to the documents. Generally, each URI has certain elements or tags associated with it that provide functionality to the document and can assist the browser when referencing the document. These tags can include multiple functions that allow the user to access the document. One of these tags would be set up to contain suggested bookmark names. Similarly if the document is written pursuant to the proposed SALT (Speech Applications Lanuguage Tags) specification, as opposed VoiceXML, the Bookmark Tag could be established in the same manner. Indeed, such tags can be established in any XML based system.

By way of further example, a "Book_mark" element or tag may be provided. The "Book_mark" tag may have several functions including "URI", "List_grammar", "Actual_grammar" and "Status_codes." The "URI" function contains the navigation point associated with the voice site that the user would like to bookmark. The "List_grammar" function provides a list of suggested names for bookmarks. The list of names is separated by a "|" so that the system can parse the various choices. The "Actual_grammar" function enables different grammars based on the name chosen by the user. In other words, it associates the "List_grammar" selected by the user with the actual grammar input by the user. This association of grammars allows for more accurate recognition and improves the user experience. Finally, the "Statue_codes" function defines unique error or messages that provide feedback to the content provider.

Thus, in this embodiment, the VXML application may provide the user with the option of bookmarking the application. If the user invokes the option, for example by saying the word "bookmark", then the application will reference the "Book_mark" tag to provide the user with a list of proposed bookmarks. The user then selects a bookmark from the list by saying the term.

In another exemplary embodiment, existing tags as defined in the VoiceXML 2.0 draft or the SALT specification may be utilized to supply a list of proposed bookmark names. VoiceXML 2.0 draft and the SALT specification both define meta elements that provide information on the associated voice-markup file. Information that is typically included in these meta elements include things like, author, copyright, description, keywords and the like. In a similar fashion, according to the exemplary embodiment, a "bookmarks" option could be created within the meta elements. This option will enable the content provider to provide a list of recommended bookmark names as part of the meta information. An example of such use of the meta elements is set forth below:

<?xml version="1.0">

<vxml version="2.0">

<meta name="Author" content="John Doe"/>

<meta name="Bookmarks" content="Headlines|Headline News|CNN Headline News"/>

. . .

</vxml>

In this manner, the voice-markup file can be the source of a list of bookmarks design to avoid confusion with existing grammars and facility the user interfacing with the system.

While it is beneficial for the content provider to provide a list of suggested Bookmark names, it is not practical to think that all content providers will do so. Therefore, there is a benefit for the system to be able to generate a list of proposed bookmark names from the content of the file being bookmarked. Specifically, the system may sample the underling file and pursuant to certain defined parameters develop a list of proposed bookmarks.

As an example, in many audio files much of the relevant information about a file is contained in the first portion of the file. As a result it is likely that a viable bookmark could be ascertained from that portion of the file. The system may then select as a proposed bookmark the beginning portion of the file (for example the first 400 ms of the file) and propose this portion of the file to the user as a bookmark.

As another example, if the file contains text, the TTS engine can take the first few words (e.g. 4) of the file and propose those to the user as a potential bookmark(s). In this way the user can be given viable options for bookmark names by the system. Once the user speaks a selection, the system can take that utterance and convert it into a grammar (i.e. a bookmark name) that is stored in the user profile. Of particular note, the system may advantageously convert the utterance to a grammar without ever having to convert it to text. Rather, the bookmark name is saved as a corresponding set of phonemes. As a result, resources are conserved by not having to convert the bookmark name all the way to text.

In a further effort to improve the accuracy of bookmark recognition, the system may also include functionality that compares an elected bookmark name with existing bookmark names and grammars to ensure there is no confusion. In one example, once the user identifies a bookmark name the system provisionally accepts the bookmark name. However, before entering the bookmark name into the user profile, the system compares the provisionally accepted bookmark name with the existing bookmark names and grammars. If there is no conflict, then the bookmark name is finally accepted and added to the user profile. If, however, the system identifies a conflict with existing bookmark names or grammars the system may then prompt the user to select another bookmark name. Another example may have the system checking for conflicts before it presents the list of suggested bookmark names to the user. Specifically, the system after retrieving and/or generating a list of suggested bookmark names from the application may compare the suggested list against the existing bookmark names and grammars in the user profile. If the system identifies a conflict, the conflicting bookmark name will not be presented to the user. There are other examples that can function individually or in combination to minimize potential conflict between bookmark names and the associated potential inaccurate recognition.

Once a bookmark is established, in response to user selection of the Recall option the bookmark-management application may direct the processor to prompt the user to speak the name of a bookmark on the user's list. Once the user speaks the name, the processor may refer to the bookmark list to determine the corresponding URI and may then load the document from that URI and execute the document.

As a further enhancement, the bookmark-management application may direct the processor to recognize the command "Recall" followed by the name of the bookmark that the user wants to recall, and to responsively load and execute the corresponding URI. For instance, in response to a user speaking "Recall Shopping," the bookmark-management application may direct the processor to refer to the user's bookmark list to find a URI that corresponds to the name "Shopping." The processor may then find the corresponding URI and load and execute the URI. (Note that the "Recall URI" grammar structure can itself be made a system-level grammar of the voice command platform, so that a user can call up a stored URI at any time, without first expressly calling up the bookmark-application.)

In response to user selection of the Edit option, the bookmark-management application may direct the processor to prompt the user to speak the name of a bookmark on the user's list. The processor may then prompt the user to indicate whether the user wants to rename or delete the entry. Other examples are possible as well.

b. Monitoring and Use of Session Information

According to another aspect of the exemplary embodiment, the enhanced system logic also provides for maintaining and using information concerning user sessions with the voice command platform. In one respect, this functionality thus involves maintaining user session information. And in another respect, this functionality then involves using the session information to enhance user interaction with the platform in some manner. By way of example, two enhancements that a user's session information can facilitate are (1) automatically transitioning a user to expert mode based on the user's navigation history, and (2) automatically restoring a session that was abruptly cut off by a system disconnect or other event.

The process of maintaining user session information and using the information to perform these exemplary functions will now be described.

i. Maintaining User Session Information

As noted above, user profile store 52 can include a record of user session information, such as current session state information as well as user navigation history. In the exemplary embodiment, the processor 22 is preferably programmed to maintain this session information for each user, i.e., to keep track of each user's session with the platform.

In terms of current session state information, for instance, the processor may be programmed to record in the user profile an indication of whether or not the speech recognition engine 36 is muted for a given user's session, as well as an indication of which TTS engine and/or voice prompt set is currently active for the user's session. These parameters can be set as flags or other parameters in the user's profile record.

In terms of navigation history, the processor may be programmed to maintain a list of the URIs accessed by the user, beginning with the most recent. In addition, as noted above, the processor may maintain a summary table that indicates, for each URI, how many times the user has accessed the URI. The processor may thus increment an entry in the summary table each time a user accesses the same URI.

Further, the processor may also be programmed to maintain in the user profile a record of how many times each user has contacted the voice command platform, possibly together with indications of the dates and/or times that the user has contacted the platform.

ii. Automatically Transitioning a User to Expert-Mode, Based on Navigation History Generally speaking, a voice command application can define a number of voice prompts, acceptable response grammars, and associated logic that the platform is to execute in response to particular responses or other events. Thus, as a user interacts with the voice command application, the platform would present designated voice prompts to the user, receive responses from the user, and carry out logic keyed to the responses or other events.

A user who interacts regularly with the same application, however, may tire of listening to the same voice prompts over and over, and having to regularly provide the same response grammars to each voice prompt. To enhance the user experience, a robust voice command application can therefore define multiple sets of voice prompts, acceptable response grammars and/or associated logic.

As an example, one set might be considered a standard set, which would be appropriate for interaction with the typical user. And another set might be considered an expert set, which would be appropriate for interaction with a user considered to be an expert. Thus, depending on whether the user who is interacting with the voice command application is designated as an expert user or not, the application may then instruct the processor to apply either the standard set or the expert set.

An expert set of voice prompts and/or acceptable response grammars may be more streamlined than the standard set, such that a user can more quickly navigate. For instance, when a given application is going to prompt a user to select between a number of choices, a standard voice prompt might be a full statement of the list of choices followed by a closing voice prompt such as "Please state your response now." In contrast, an expert voice prompt at the same navigation point might be a scaled down version of the list of choices and/or a shorter closing voice prompt such as "Ready." Alternatively, the expert voice prompt might omit portions of the standard voice prompt in their entirety and might substitute a short tone or other mechanism to solicit a response.

As a specific example, at a given navigation point in a weather reporting application, the weather reporting application might define as a standard voice prompt the words, "If you would like to hear today's weather, please say 'today.' If you would like to hear an extended forecast, please say 'extended.' Please speak your response now." And at the same navigation point, the weather reporting application might define an expert voice prompt, "Today or Extended?" followed by a quick prompting tone. Depending on whether the user who is currently interacting with the application is designated as an expert or not, the application may then instruct the platform to apply either the standard prompt or the expert prompt.

In accordance with the exemplary embodiment, a given user can be designated as either a standard-mode user or an expert-mode user. (Other such designations or use-levels are also possible. For instance, a user could be a beginner, intermediate or advanced user.) Further, for a given user, different use-level designations can be specified for different navigation points. For instance, a user may be designated as a standard-mode user for a particular application (e.g., a particular URI), and the user may be designated as an expert-mode user for another application or for a particular navigation point within an application.

Preferably, the user profile store 52 will include an indication, per user, of a use-level, such as whether or not the user is an expert-mode user. If a user is globally designated as an expert mode user for all applications that the voice command platform executes, the user's profile record may include a flag that indicates the user is an expert-mode user. Alternatively, if the user is designated as an expert-mode user for some navigation points and a standard-mode user for others, then the user's profile record can include a table that indicates, per navigation-point, whether the user is an expert-mode user. The table may, for instance, list URIs (and/or other navigation point labels) and, for each URI, provide a flag indicating whether the user is an expert-mode user.

At a given navigation point in a voice command application, the application can then include logic that instructs the processor to apply a standard-mode prompt if the user is a standard-mode user or to apply an expert-mode prompt if the user is an expert-mode user. In response to that logic, the processor may consult the user profile store to determine whether or not the user is an expert-mode user. If the user is an expert-mode user, the processor may then apply the expert-mode prompt. And if the user is a standard-mode user, the processor may apply the standard-mode prompt.

In accordance with the exemplary embodiment, as noted above, the enhanced system logic further includes a mechanism to automatically switch a user from standard mode to expert mode, either generally or for specific navigation points. The transition to expert mode can occur based on any designated event or combination of events.

For example, as noted above, the processor can be programmed to review a user's navigation history and to automatically transition a user to expert mode after the user has accessed a particular navigation point, particular navigation points, and/or the voice command platform generally, more than a threshold number of times. The processor may perform this review each time a user calls the voice command platform, or at other designated times.

This logic can be as simple or as complex as desired. For instance, the logic could direct the processor to switch a user to expert mode for a given navigation point after the user has accessed the navigation point at least 10 times. Alternatively, the logic could direct the processor to switch a user to expert mode for a given application once the user has accessed the application at least 20 times and has accessed at least two second level navigation points in the application. Other examples are possible as well.

In the exemplary embodiment, when the processor determines that the user should be transitioned to expert mode, the processor could prompt the user with an announcement indicating the benefits of the transition and requesting the user's consent to the transition. Alternatively, the processor could perform the transition without asking the user for consent. Further, the processor could perform the transition even when the user is offline, such as at nighttime when the platform might have more available processing power.

It should be further understood that the processor can also transition a user more gradually through use-modes, rather than just transitioning between two modes (such as a "standard" (not-expert) mode and an "expert" mode). For instance, the expert-mode transition logic might operate to slowly transition a user to more of an expert mode as the user interacts more with the platform. In this sense, transitioning a user from standard mode to expert mode could be interpreted to mean transitioning the user from any use-mode (which might be considered "standard" to a more advanced use-mode (which might be considered "expert"), even though other modes may exist as well.

As an example, the more the processor executes a given set of VXML prompt logic when interacting with a given user, the more abbreviated the prompts may become (as defined by graduated levels of logic in the application, keyed to a use-level set for the user, for instance). The first time, the processor might present a long tutorial prompt to the user. The second time, the processor might present a detailed version of the voice prompt. The 10th time, the processor might present a more abbreviated version of the voice prompt. And the 25th and later times, the processor might present the user with only a tone prompt.

iii. Using Session Information to Help Restore a Session After System Disconnect As noted above, the enhanced system logic can also facilitate restoring a user to where the user left off in a voice command session, when a session ends abruptly. This can occur, for instance, if the user's telephone connection to the platform gets cut off (e.g., as a result of a coverage drop, signal fade, hang-up or out-dialed call), if the system encounters an error that causes the session to be dropped, or in other instances.

In the exemplary embodiment, when a system disconnect occurs, the processor will preferably maintain an indication of the disconnect for a period of time (e.g., approximately 15 minutes) in user profile store 52, together with an indication of the user's navigation points and perhaps other session information at the moment of the disconnect. Provided that the platform keeps a log of the navigation points that the user has accessed, as described above, the user's latest navigation point could be the most recent navigation point in that log.

When a user calls the platform, the processor may be programmed to consult the user's profile record to determine whether a system disconnect occurred during a session with the user. If the processor determines that a system disconnect occurred, the processor may then prompt the user to indicate whether the user wants to resume where the user left off or, rather, whether the user wants to begin from the start. After the user responds, the processor then either loads and executes an application where the user left off or begins a voice command session normally.

For example, during a session with the voice command platform, a user may be navigating through a set of driving directions. Preferably, the content provider has arranged each step in the driving directions at a separate URI (where one URI leads to the next). When the user navigates to step 5 of the driving directions, the processor may record the URI of step 5 in the user's navigation history, preferably together with a name of the navigation point (e.g., "Step 5 of driving directions"). At that point, a system disconnect might occur. (For instance, the user might intentionally disconnect only to return later to get later steps of the directions.) The processor may then record a flag or other indication in the user profile, indicating that a system disconnect occurred (e.g., in response to the fact that a normal logoff sequence did not occur, or based on any other suitable logic), and noting the time of the disconnect.

When the user then calls back the platform, the processor may consult the user's profile and determine that a system disconnect occurred. In response, the processor may programmatically prompt the user to indicate whether the user wants to resume where the user left off. For instance, based on the user's navigation history, the processor may identify the navigation point that the user most recently visited and may then prompt the user accordingly, such as "Say 'Step 5' to resume Step 5 of the Driving Directions or say 'Voice Command' to start over." Once the user responds, the processor may then either load the associated URI.

3. Provisioning

In the exemplary embodiment, a provisioning system may be established so as to allow users to set up and manage their profiles. For instance, a provisioning server may be provided on the Internet and may function as an intermediary between the voice command platform and users. As such, the provisioning server may have real-time access to the user profile store 52 and may function to validate data (e.g., user-specified changes to profile records) before writing them to the profile store.

A user may connect with the provisioning server from a web browser on a client computer. Once connected, the user would log in (e.g., by providing a user ID, which the provisioning server would match with a profile record), and the provisioning server would then present the user with a consolidated summary of the user's profile record. The consolidated summary may include information such as: (i) the persona and/or default TTS engine designated for the user, (ii) a list of the user's personal-grammars and their corresponding actual grammars, (iii) the user's expert mode state, (iv) the user's navigation history, (v) a list of the user's bookmarks and (vi) the user's consolidated messaging summary. The provisioning server may then permit the user to modify some or all of this information via the web interface.

In addition, the provisioning server may function as an interface through which content providers can provide the voice command platform with secondary phoneme dictionaries. Preferably, a content provider would log in, and the provisioning server would then allow the content provider to upload or modify secondary phoneme dictionaries and associations with applications. The provisioning server may then store the secondary dictionaries on the voice command platform or elsewhere to be accessed and used by the platform.

4. Conclusion

Exemplary embodiments of the present invention have been described above. Those skilled in the art will understand, however, that changes and modifications may be made to these embodiments without departing from the true scope and spirit of the invention, which is defined by the claims. In particular, the present invention has been principally described as an implementation as a platform in the VoiceXML language. It will be understood that it is equally as applicable in other XML based languages, including the Speech Application Language Tags (SALT) proposed standard.

What is claimed is:

1. In a voice command platform of the type comprising a processor, and a voice-browser application executable by the processor to interpret voice-markup files, a method comprising:

while the processor is executing the voice-browser application to interpret a first voice-markup file, the processor receiving a user request to bookmark an object that is specified in the first voice-markup file but that is not itself a voice-markup file and is therefore not itself interpretable by the voice-browser application; and responsive to the user request, the processor establishing a second voice-markup file that specifies the object, wherein the second voice-markup file is interpretable by the voice-browser application so as to call up the object.

2. The method of claim 1, further comprising the step of:
storing a bookmark pointing to the second voice-markup file in response to the user request.

3. The method of claim 2, further comprising:
the processor thereafter receiving a user request to recall the bookmark, and the processor responsively executing the voice-browser application to interpret the second voice-markup file, so as to call up the object.

4. The method of claim 1 wherein the processor executes a scripting logic to create the second voice-markup file.

5. The method of claim 1, further comprising the step of:
having the platform propose at least one bookmark name to the user after receipt of the user request to bookmark the object.

6. The method of claim 5 wherein at least one of the proposed bookmark names is generated as a result of the platform's analysis of the content of the object.

7. The method of claim 5 wherein prior to proposing the bookmark name to the user, the platform confirms that the proposed bookmark name does not conflict with any grammars already existing on the platform.

8. The method of claim 2 wherein the bookmark includes a bookmark name and the bookmark name is stored as a set of phonemes.

9. In a voice command platform of the type comprising a processor, and a voice-browser application executable by the processor to interpret voice-markup files, a method comprising:

while the processor is executing the voice-browser application to interpret a first voice-markup file, the processor receiving a user request to bookmark an object that is specified in a given voice-markup file but that is not itself a voice-markup file and is therefore not itself interpretable by the voice-browser application; and the processor thereafter receiving a user request to recall the object, and the processor responsively (i) establishing a second voice-markup file that specifies the object and (ii) executing the voice-browser application to interpret the second voice-markup file, so as to call up the object.

10. The method of claim 9 further including the step of storing the bookmark after recieving the user request to bookmark and before receiving the user request to recall wherein the bookmark is stored in a manner that points to a navigation point corresponding to the object.

11. The method of claim 9 wherein the processor executes a scripting logic to create the second voice-markup file.

12. The method of claim 9, further comprising the step of:
having the platform propose at least one bookmark name to the user after receipt of the user request to bookmark the object.

13. The method of claim 12 wherein at least one of the proposed bookmark names is generated as a result of the platform's analysis of the content of the object.

14. The method of claim 10 wherein the stored bookmark includes a bookmark name and the bookmark name is stored as a set of phonemes.

15. A voice command platform comprising:

a user communication interface for communicating with users via a telecommunications network;

a processor;

an application-processing module executable by the processor to process voice command applications, the voice command applications including voice-markup files that each have respective navigation points, and the voice command applications defining user-prompts, allowed grammars, and application-logic, the application processing module being capable of bookmarking a navigation point of an object specified within the a voice-markup file of a voice command application wherein said object is not a voice-markup file;

a user profile store including bookmark-data respectively for each of a plurality of users, wherein the bookmark-data for a given user includes a number of bookmark-names each pointing to a respective, corresponding navigation point; and speech-recognition logic executable by the processor for recognizing a bookmark-name in a speech signal received from the given user via the user communication interface;

wherein the processor uses the given set of bookmark-data to identify the navigation point corresponding to the recognized bookmark-name, and the processor then loads and processes the object that has that navigation point.

16. The voice command platform of claim 15, wherein the voice command applications are VXML applications.

17. The voice command platform of claim 15, wherein the processor loads a voice-markup file referencing the navigation point corresponding to the recognized bookmark-name and then processes the voice-markup file.

18. The voice command platform of claim 15 where the stored bookmark data includes bookmark-names from lists of bookmark-names provided by a voice command application.

19. The voice command platform of claim 15 wherein the stored bookmark data includes bookmark-names generated by the platform from the content of the voice-markup file.

20. The voice command platform of claim 15, further comprising:

bookmark-saving logic executable by the processor to save a bookmark-name and corresponding navigation point as bookmark-data for a user.

21. The voice command platform of claim 20, wherein the bookmark-saving logic is executable by the processor in response to a bookmark save command that a user speaks to the voice command platform.

22. The voice command platform of claim 15, wherein:
the speech-recognition logic is executable by the processor to recognize a bookmark-recall command and a bookmark-name in the speech signal received from the given user via the user communication interface; and
in response to the bookmark recall command, the processor uses the given set of bookmark-data to identify the navigation point corresponding to the recognized bookmark-name and the processor then loads and executes a voice-mark up file referencing the object at that navigation point.

23. The voice command platform of claim 15, wherein when bookmarking the object, the processor creates a new voice-markup file that specifes the object and the bookmark points to the navigation point of the new voice-markup file.

24. The voice command platform of claim 15 wherein the processor crates a new voice-mark the specifies the object at the time the user recalls the bookmark that points to the object.

25. The voice command platform of claim 23 or 24 wherein the new voice-mark up file is created by the processor executing a scripting logic.

26. A bookmark-management method comprising:
generating one or more proposed bookmark-names from the content of a voice command application;
proposing a list of bookmark-names for a voice command application, wherein the list include bookmark names generated from the content within a voice command application;
receiving from a user, via a telecommunications network, a selection of a bookmark-name;
storing bookmark-data indicating the selected bookmark-name and the corresponding pointer to a navigation point;
receiving from a user, via a telecommunications network, a bookmark-recall command designating a given bookmark-name;
using the bookmark-data to identify a given navigation point corresponding to the given bookmark-name; and
executing a voice command application that is located at the given navigation point.

27. The bookmark-management method of claim 26, executed by a processor on a voice command platform.

28. The bookmark-management method of claim 26, wherein the voice command applications are VXML applications.

* * * * *